Dec. 24, 1946.    R. B. BARNES    2,413,208
REFRACTOMETER FOR CHEMICAL REACTIONS
Filed April 6, 1945    2 Sheets-Sheet 1
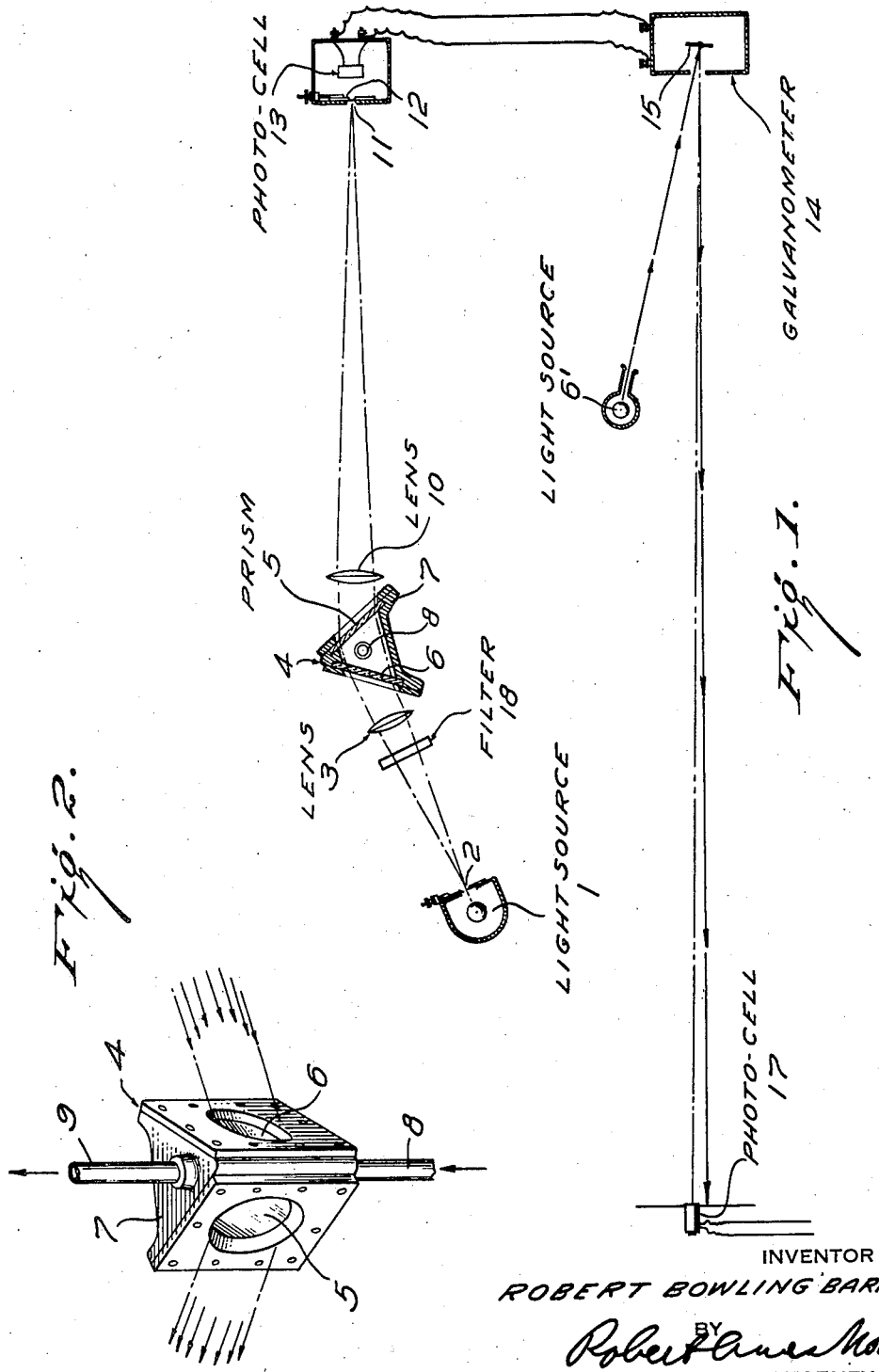
INVENTOR
ROBERT BOWLING BARNES
BY
ATTORNEY Dec. 24, 1946.    R. B. BARNES    2,413,208
REFRACTOMETER FOR CHEMICAL REACTIONS
Filed April 6, 1945    2 Sheets-Sheet 2
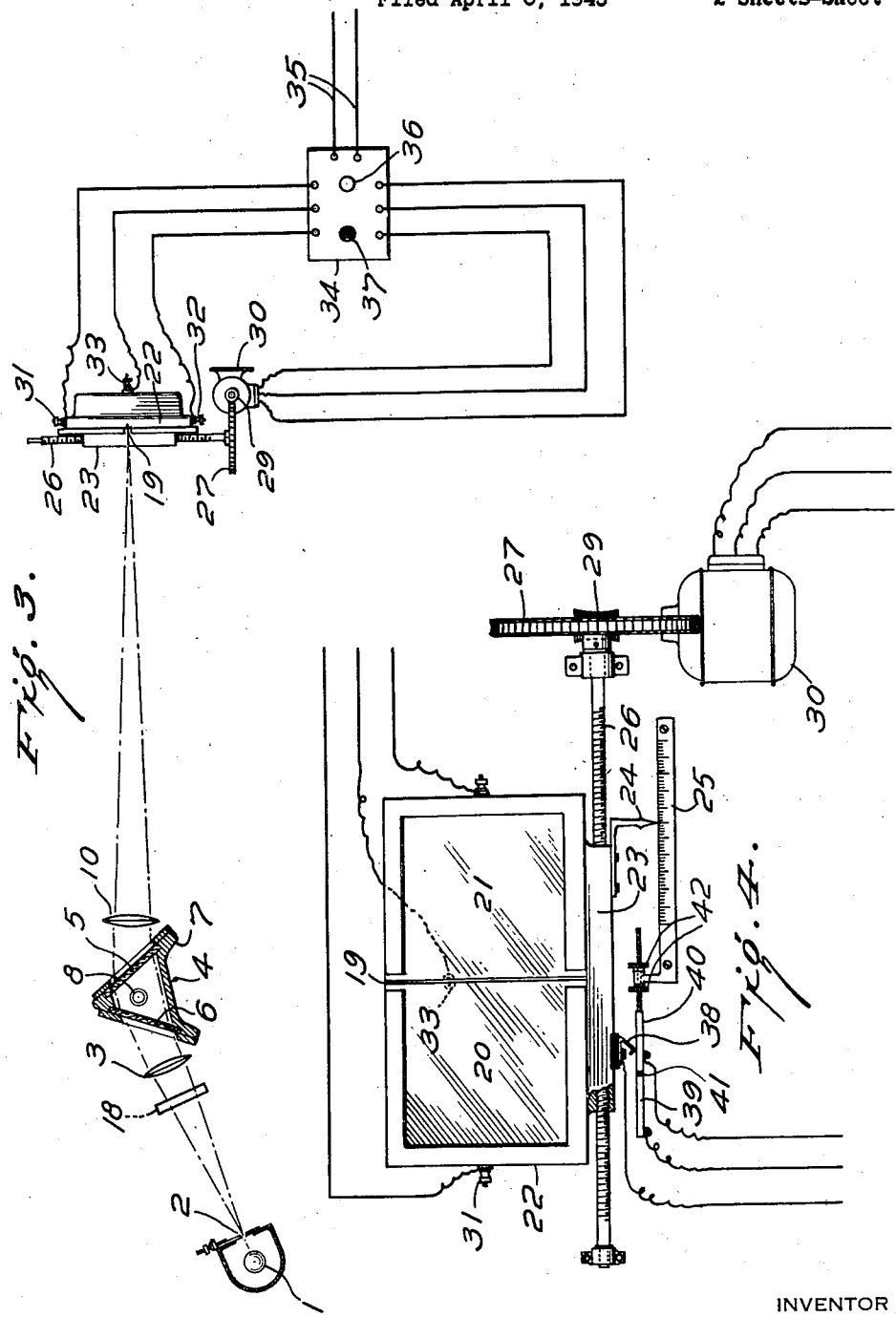
INVENTOR
ROBERT BOWLING BARNES,
BY
ATTORNEY Patented Dec. 24, 1946

2,413,208

UNITED STATES PATENT OFFICE 2,413,208

REFRACTOMETER FOR CHEMICAL REACTIONS

Robert Bowling Barnes, Stamford, Conn., assignor to American Cyanamid Company, New York, N. Y., a corporation of Maine Application April 6, 1945, Serial No. 586,865

12 Claims. (Cl. 250—41.5)

This invention relates to an apparatus for continuously analyzing a fluid stream having a plurality of components of varying refractive indices, and more particularly to an apparatus for transforming changes in refractive index of the fluid stream into electrical currents.

There are many reactions in which a fluid mixture is involved, the composition of which is to be carefully measured and if desired controlled. Examples of such mixtures are solutions of dicyandiamide in liquid ammonia for use in the production of melamine, reaction mixtures for producing acrylonitrile by the interaction of hydrocyanic acid and ethylene oxide, and the like. In such reactions it is important to know at all times the chemical constitution of the mixture or at least the concentration of one or more components therein, and it is desirable in many cases to effect automatic control which will keep the composition of the reaction mixture within certain predetermined limits. The present invention is applicable to processes in which a fluid reaction mixture changes its refractive index with changes in composition.

A proposal has been made in the past to effect a control or measurement by passing a sample of a multicomponent fluid through a hollow prism, passing light therethrough and causing the spectrum produced to impinge through a wide slot onto a photocell. Changes in refractive index result in a shift of the spectrum produced and when the spectrum is normally located either missing the slot or covering substantially all of the slot, a movement of the spectrum will result in a greater or smaller proportion thereof being cut off so that the amount of radiant energy striking the photocell will vary and it has been proposed to utilize suitable relay circuits to be actuated by these variations in photocell current. The arrangement proposed was open to many serious practical disadvantages. The change of photocell current with change of refractive index was relatively slow because until the spectrum had been moved a considerable distance so that a fairly large proportion of the light no longer struck the photocell there was not sufficient difference in photocell current to effect reliable control. An even more serious disadvantage lay in the fact that measurement and control depended entirely on differences in photocell current and these differences depended not only on the change of refractive index of the fluid being measured but also on the intensity of light emitted by the light source and the color transmission of the fluid medium. Any factors affecting either of these characteristics would be treated by the photocell as changes in radiant energy striking it and it would correspondingly behave in a similar manner as in the case of a shift of the spectrum due to change in refractive index. In other words, the device was not reliable for precise work and was apt to give false readings.

The present invention utilizes the change of refractive index of a fluid to effect a control which within very wide limits is completely independent of changes in intensity of light source, changes in sensitivity of radiant energy detectors and changes in color or overall transmission of the fluid to be measured. Also the present invention permits control within very close limits which is an impossibility with the device hitherto proposed, and all of these important advantages are obtained without any drawbacks.

According to the present invention a portion of the fluid to be measured is introduced into a hollow prism and a beam of light passed through the prism to form a spectrum if the source emits a continuous band of light or a single line or lines if the source emits a line spectrum. In this respect the present invention may be considered as belonging to the general class of measurements hitherto attempted. However, it performs a different function and one of the essential differences from the proposed methods of the prior art lies in the nature of the light beam. Instead of collimating a beam from an ordinary source a very narrow luminous line of substantially monochromatic light is employed. This is effected by using a narrow sharply defined slit as the light source, which slit is imaged by the optics onto the plane of the detecting mechanism. Substantially monochromatic light may be produced by combinations of sharp cutting filters but this is not preferred because it is extremely difficult to produce a sharply defined spectrally narrow band of light in this way without excessive losses in energy. It is, of course, possible to use a monochromator with a sharply defined exit slit for the narrow wave length band or line with which it is desired to operate. This however, adds additional optical apparatus and produces a luminous line of fairly low energy, most of the energy of the source being unused. I therefore prefer to use a source of radiation which emits a spectrum formed of lines or very narrow bands. Such a source may advantageously be a high pressure mercury arc utilizing one of the intense lines of the mercury spectrum, for example, the green line. As far as operation of the instrument is concerned such a source may be considered to produce a monochromatic beam because the other lines are sufficiently far removed so that they do not strike the final radiation detector, as will be described below. For certain special purposes, and where it is desired to eliminate stray light more completely, the mercury arc source may be associated with suitable filters which absorb the other lines. Such filters are simpler than filters which are intended to cut out all radiation from the light source except a narrow band, and therefore they can be made with a higher transmission for the desired line.

The monochromatic beam from the narrow slit as a source is collimated by suitable optics so that it passes through the prism in the form of substantially parallel light in the customary manner. Following the prism the source is imaged sharply on a plane which contains at least one sharply defined edge. This may be a single knife edge, it may be a slit or it may be a sharp edge narrow zone of insensitivity on a photocell, such as a barrier layer photocell, which has a sharp line scratched down the center through the active material. In the case of the knife edge and the slit a suitable photoresponsive means is placed back of it.

The instrument is then adjusted, for example, by moving the straight edge or slit or by moving the photocell where the split photocell referred to above is employed, until the sharply imaged luminous line just misses striking the photocell or, in the case of a knife edge or slit, either just misses the photocell or just strikes it. In any arrangement a very slight movement of the sharply imaged narrow line will cause an abrupt change from dark cell current of the photosensitive device to that corresponding to full illumination, or vice versa. The sensitivity of the instrument is extraordinary. A minute change in the refractive index of the fluid to be measured which may move the sharp image of the line source as little as a millimeter or less will cause a relatively enormous change in current from the photosensitive device.

The operation of the device within very wide ranges is unaffected by changes in the intensity of the light source or with changes in the sensitivity of the photoelectric device. There is no need for using carefully matched replacement photocells and the reliability of the device is substantially unaffected by changes in the light transmission characteristics of the fluid so long as these changes are not so great that the fluid absorbs almost the whole of the radiation. As long as there is sufficient energy in the image of the line or narrow band to actuate the photocell the device will operate on changes of refractive index of the fluid to be measured, and on these changes only. Color changes, turbidity within very wide ranges, and other factors which have made refractive index measurements in the past unreliable, do not affect the present instrument at all.

Because of the fact that an extremely narrow sharply imaged line of light is used the control of the composition of the fluid can be very accurately maintained, particularly when the output of the photoelectric device is used to control changes of composition through suitable relays. For this reason a very accurate control of a fluid composition may be maintained with complete reliability and without the necessity of any skilled supervision.

The nature of the photoelectric device is not critical and any suitable photoelectric device may be used. Because of the fact that with the preferred light source of the present invention there is produced a light line of adequate energy there is considerable advantage in the use of self generating photoelectric devices, such as barrier layer photocells. This type of photoelectric device is therefore preferred, and in the remainder of this specification the descripiton will refer to the use of such photocells, it being understood that the invention is not limited to this preferred modification but is usable with any photoelectric device capable of transforming light into electric energy.

It is usually desirable to provide for adjustment of the present device, and this may be effected by provision of means, such as screws, for moving the knife edge or adjustable slit, or in the case of the split photocell, with central scratch moving the whole photocell. This is necessary in most instruments because the instrument must be adjusted for the particular predetermined fluid composition which it is desired to maintain, and if any change in composition is desired a readjustment of the device must be effected. However, since the readjustment consists merely in operating known precision slit moving devices it requires no skill.

For most operations it is desired to maintain a predetermined composition. In other words the instrument is used as a control device. For this purpose it is sufficient to provide for adjustable positioning of the knife edge slit or scratch. In some cases, however, it is desirable to operate the instrument as a control for a controlling or recording instrument, and this is more readily effected with the scratch photocell type of photoelectric device, although the same results may be obtained with two slits separated by a very narrow band of opaque material. In cases where the indication or record is desired the whole photoelectric device is made capable of movement and a driving force, such as an electric motor, is provided which is operated in one direction when one side of the scratch photocell is illuminated and in the opposite direction when the other side is illuminated. The movement of the photocell of course is in a direction to bring the bright line back to focus on the opaque central scratch. In the case of two slits and two photocells the operation brings the sharp line back on the narrow opaque dividing line between the two slits. The amount of movement required is transferred to an indicating or recording device of conventional type, the details of which form no part of the present invention. Where an indicating or recording null instrument is desired it may be used with and without control of the composition of the fluid to be measured. In other words, the instrument may be a very accurate measure of changes in composition of the liquid in terms of its refractive index changes, and the liquid may then be adjusted manually to bring the composition back to the predetermined one. Automatic control may be provided in addition to the measuring feature if desired, and in the same manner as in the simpler type of instrument, which operates only as an indicating device.

The present invention will be described in conjunction with a device suitable for use with liquids under high pressure, such as for example a solution of dicyandiamide in liquid ammonia used in the production of melamine. It is an advantage of the present invention that it is so rugged that even liquids under extreme pressures can be satisfactorily controlled. Where lower pressures are involved lighter equipment can, of course, be used than that illustrated, in which:

Fig. 1 is a simple diagrammatic view of a device according to the invention using an optical relay for control purposes only;

Fig. 2 is a detailed perspective of the prism on a somewhat larger scale;

Fig. 3 is a diagrammatic view of a modified type of device which gives an indication of refractive index change; and Fig. 4 is an enlarged detail of the double photocell and its moving means.

In the modification shown in Figs. 1 and 2 a source of light, such as for example, a high pressure mercury arc 1 emits a beam from its light housing through an adjustable slit 2 as a source which beam is collimated by the lens 3 and passes through the liquid prism 4 which is formed of a heavy stainless steel body 7 with inlet and outlet pipes 8 and 9. The stainless steel body 7 is provided with heavy glass or quartz windows 5 and 6. The beam passing through the prism is deviated and the slit 2 is imaged by means of the lens 10 on the plane of the slit 11 in a suitable housing containing photocell 13. The width of the slit 11 can be varied by the adjustable knife edge 12. The photocell 13 is connected to a sensitive galvanometer 14 having a mirror 15 on which is projected a beam from light source 6'. The beam is reflected so as to strike or miss photocell 17 depending on the refractive index of the liquid in the prism 4.

The optical relay utilizing a mirror galvanometer is shown only as a means of illustration of a typical high sensitivity relay. Any other type of relay may be employed but because of its sensitivity and reliability I prefer to use an optical relay. When this preferred type of apparatus is used, the same beam which actuates the photocell 17 may also move on a suitable scale so that there is visible as well as electrical response.

The present invention is not directly concerned with the use which is made of the current from the photocell 17. It may be employed for any desired purpose, usually to control through suitable relays valves or other control apparatus which will serve to counteract any change in chemical composition of the mixture flowing through the prism 4. Thus the device will serve to maintain the composition of this fluid constant within any desired range. Since, however, these controls are operated through conventional relay systems, their particular nature does not form any part of the present invention.

It is not essential that the slit 11 be very narrow as it is really the position of the knife edge 12 which controls the operation of the device and even with a wide slit the same accuracy may be obtained. For many purposes, however, a narrow slit presents practical advantages as it minimizes the stray light falling on the photocell when the beam or line of light is not passing through the slit. In some cases where there may be some wide fluctuations in refractive index, a wider slit is advantageous as otherwise the band of light might pass across the slit to a position where it was cut off by the other edge of the slit before control devices had operated to bring back the fluid to the desired composition. In every case, of course, the device must be adjusted for the requirements of the particular fluid mixture which is to be measured.

When it is desired to use a filter either with a light source which emits continuous radiation or to cut out unwanted lines from a source that produces a line spectrum a filter can be introduced at various points. I prefer to introduce it between the slit 2 and the collimating lens 3 as is shown at 18.

The modification described in Figs. 3 and 4 resembles that of Figs. 1 and 2 as far as light source and prism are concerned, and the same parts bear the same reference numerals. The detecting device, however, is different. In place of a slit and photocell a double barrier layer photocell consisting of a left hand half 20 and a right hand half 21 is provided with a central dividing line 19 which constitutes a straight edge. This may advantageously be a deep scratch cutting through the active material of the photocell and is so shown in the drawings. The double photocell is mounted in a framework 22 which contains a threaded extension 23 carrying a pointer 24 moving over a scale 25. A threaded shaft 26 passes through the extension 23 and carries at one end a worm wheel 27 which is driven by the motor 30 through the worm 29. The figures are diagrammatic and the conventional guide rails for the movable framework are not shown. The double photocell is provided with a common back terminal 33 and the two halves are provided with terminals 31 and 32. Wires from these terminals lead to a relay box 34 supplied with power from power line 35. The relays are of suitable known design and cause the motor 30 to rotate in one direction when the one half of the photocell is illuminated and in the opposite direction when the other half is illuminated. The phasing of the motor is such that the movement of the two halves of the photocell is in a direction to bring the image of the narrow line of light back onto the straight edge scratch 19. The movement of the photocell is a measure of the refractive index which is shown on the scale 25. Manual push buttons 36 and 37 are provided on the relay box to cause the motor 30 to operate in one direction or the other in order to move the photocell to its initial position.

The device shown may be used purely as an indicating null instrument giving an indication of the change in refractive index. If desired it may also be designed for control or maintenance of a predetermined composition. This is effected by providing the moving extension 23 of the photocell framework with an insulated terminal 38 moving over a surface consisting of two conducting segments 39 and 40 with a narrow central insulating segment 41. The segments may be moved by the screw 42 to a point of predetermined refractive index. The wires from the terminal 38 and from the two conducting segments 39 and 40 lead to controls for effecting a change of composition of the fluid in the press. These controls are not shown, as they are of standard design and their particular structure forms no part of the present invention.

The modification shown in Figs. 3 and 4 presents considerable advantage over that shown in Fig. 1. When a narrow slit is used, as in Fig. 1, and there is a sudden change of refractive index, it is possible that the image of the sharp line will move across the slit too rapidly for the photocell 17 to provide for the necessary change in composition of the fluid to restore it to its original composition. In the device shown in Fig. 3 this is impossible as a further movement of the image will remain on the relatively large surface of the two halves of the split photocell. There is therefore no danger that the refractive index might change too rapidly for the instrument to keep up with it. For this reason the modification of Figs. 3 and 4 may be considered as preferred.

It is possible to avoid the danger of the instrument not changing the composition of the liquid sufficiently rapidly when the modification of Fig. 1 is used if a single straight edge is employed instead of a slit. However, this introduces the possibility that the photocell will then respond to stray light and unless the stray light is kept down to a very low figure the reliability of the instrument may be adversely affected. In the case of the device of Figs. 3 and 4 stray light will strike the two photocells equally, and as they are of the same shape and area the effect of stray light striking them equally will be completely neutralized since their outputs are connected so as to cause the motor to rotate in opposite directions. Within wide limits, therefore, the modification shown in Figs. 3 and 4 is not affected by stray light. Of course stray light is undesirable because if it becomes of a magnitude comparable to that of the image of the light source the sensitiveness and reliability of the response of the instrument will be somewhat affected. However, stray light is usually of a much lower order of intensity than the line image, and it is therefore possible to operate reliably even though some stray light may exist in the system. This is of importance in cases where there may be turbidity in the fluid which is passing through the prism. Turbidity, of course, will effect some scattering and produce a certain amount of stray light. Unless the turbidity reaches very high levels, however, this is not of importance.

It is an advantage of the modification shown in Figs. 3 and 4 that it is very simple and no exit slit is necessary in most cases. Where liquids of very high turbidity are to be measured it may be desirable to eliminate scattered light by using a wide slit in front of the double photocell. This slit will cut out a large portion of the scattered light without introducing too great difficulties due to the possibility of the image passing over a narrow slit too rapidly for instrument to respond.

In most cases it is desirable to operate the present invention using a band of visible light. However, the invention is not limited thereto and operates with the same efficiency regardless of whether the narrow band of radiation is in the visible, ultraviolet or infrared portion of the spectrum. In the case of ultraviolet bands the optics must, of course, be quartz, and in the case of infrared quartz or other suitable optics should always be employed.

I claim:

1. A device for transforming changes of refractive index of a fluid into electrical currents which comprises in combination and in optical alignment a source of radiation in the form of a narrow luminous line or band, a hollow prism and means for passing fluid therethrough, a straight edge non-photosensitive material and at least one device for changing light fluctuations into electric currents, means for producing a collimated beam of monochromatic radiation from said source passing through the hollow prism, and means for imaging the source in the plane of the straight edge, the image being parallel to the straight edge, the orientation of the light source and straight edge relative to the prism being such that changes in refractive index of the fluid in the prism will cause the image of the luminous line in the straight edge plane to pass transversely across the straight edge.

2. A device for transforming changes of refractive index of a fluid into electrical currents which comprises in combination and in optical alignment a source of radiation in the form of a narrow luminous line or band, a hollow prism and means for passing fluid therethrough, a slit and a device for changing light fluctuations into electric currents, means for producing a collimated beam of monochromatic radiation from said source passing through the hollow prism, and means for imaging the source on the slit the image being parallel to the slit, the orientation of the light source and slit relative to the prism being such that changes in refractive index of the fluid in the prism will cause the image of the luminous line to pass transversely across the slit.

3. A device for transforming changes of refractive index of a fluid into electrical currents which comprises in combination and in optical alignment a light source having a line spectrum, a narrow slit associated therewith and constituting a narrow luminous line source, a hollow prism and means for passing fluid therethrough, at least one straight edge of non-photosensitive material and at least one device for changing light fluctuations into electric currents, means for producing a collimated beam of monochromatic radiation from said slit passing through the hollow prism, and means for imaging the slit in the plane of the straight edge, the image being parallel to the straight edge, the orientation of the slit and straight edge relative to the prism being such that changes in refractive index of the fluid in the prism will cause the image of luminous line in the straight edge plane to pass transversely across the straight edge.

4. A device for transforming changes of refractive index of a fluid into electrical currents which comprises in combination and in optical alignment a source of radiation in the form of a narrow luminous line or band, a hollow prism and means for passing fluid therethrough, twin barrier layer photocells having front surfaces forming a single plane divided by a narrow non-photosensitive line constituting a straight edge, means for producing a collimated beam of monochromatic radiation from said source passing through the hollow prism, and means for imaging the source in the plane of the straight edge, the image being parallel to the straight edge, the orientation of the light source and straight edge relative to the prism being such that changes in refractive index of the fluid in the prism will cause the image of the luminous line in the straight edge plane to pass transversely across the straight edge.

5. A device for transforming changes of refractive index of a fluid into electrical currents which comprises in combination and in optical alignment a light source having a line spectrum, a narrow slit associated therewith and constituting a narrow luminous line source, a hollow prism and means for passing fluid therethrough, a double barrier layer photocell having front surfaces forming a single plane divided by a narrow non-photosensitive line constituting a straight edge, means for producing a collimated beam of monochromatic radiation from said source passing through the hollow prism, and means for imaging the source in the plane of the straight edge, the image being parallel to the straight edge, the orientation of the light source and straight edge relative to the prism being such that changes in refractive index of the fluid in the prism will cause the image of the luminous line in the straight edge plane to pass transversely across the straight edge.

6. A device according to claim 1 including means for effecting transverse movement of the straight edge.

7. A device according to claim 2 including means for effecting transverse movement of the straight edge.

8. A device according to claim 3 including means for effecting transverse movement of the straight edge.

9. A device according to claim 4 including means for effecting transverse movement of the straight edge and twin photocells.

10. A device according to claim 5 including means for effecting transverse movement of the straight edge and twin photocells.

11. A device according to claim 5 including means for effecting transverse movement of the straight edge and photocell, said means including driving means for transferrous movement of the straight edge and twin photocells in one direction when one barrier layer photocell is illuminated and in the opposite direction when the other cell is illuminated, the drive directions being such as to bring back the image of the narrow luminous line onto the dividing line.

12. A device according to claim 5 in which the straight edge and photocell are capable of transverse movement, electrically driven means for said transverse movement responding to the outputs of the two halves of the double photocells which are connected in opposition, the connections from the outputs of the twin photocells the electric driving means being such as to bring back the image of the narrow luminous line onto the straight edge.

ROBERT BOWLING BARNES.